Patented Jan. 28, 1936

2,028,764

UNITED STATES PATENT OFFICE 2,028,764

SYNTHESIS OF FORMIC ACID

Henry Dreyfus, London, England

No Drawing. Application October 28, 1932, Serial
No. 640,004. In Great Britain December 1, 1931

13 Claims. (Cl. 260—114)

This invention relates to the synthesis of formic acid.

I have found that formic acid can readily be prepared by subjecting carbon monoxide to reaction with water in presence of acids or acid substances. Further, I have found that the reaction is accelerated by the presence of salts or substances capable of absorbing carbon monoxide, such for instance as cuprous chloride, silver nitrate and the like.

Advantageously the reaction may be performed at high or relatively high temperatures, such for instance as between about 100° C. and about 350° C., and especially about 150° C. to 250° C. Superatmospheric pressures, e. g. up to about 20 atmospheres or more, may if desired be employed to accelerate the reaction.

For the purposes of the invention I preferably employ organic acids, and especially a lower fatty acid such as formic or acetic acid, as the acid or acid substances. Hydrochloric acid is another instance of an acid that is very useful. Metallic acids or oxides, particularly such as are hydrating catalysts, e. g. chromic acid, tungstic acid and the like, are also useful acids or acid substances for the purposes of the invention. The use of such acids is preferable to that of sulphuric and like acids having a strong dehydrating action, as such acids are liable to have a destructive effect upon the reaction product and may also exercise a deleterious effect on substances which are capable of absorbing carbon monoxide and are employed in the reaction, although such acids may be employed if desired. Moreover, sulphuric acid may be satisfactorily employed in conjunction with copper sulphate, or copper sulphate, which is itself an acidic substance, may be employed in absence of sulphuric or other acid.

The reaction of the invention may be performed in any convenient way. Thus, for instance, mixtures of carbon monoxide and steam may be passed into or through heated acids or solutions thereof under normal or superatmospheric pressure. For instance, the said mixtures may be passed into or through acetic acid, formic acid or hydrochloric acid. Advantageously the acids may contain substances capable of absorbing carbon monoxide, particularly cuprous chloride. The mixtures of carbon monoxide and steam may contain the carbon monoxide in any relative proportion; I prefer, however, to use mixtures containing substantially one molecule of carbon monoxide to each molecule of steam. If desired, the carbon monoxide may be employed without admixture of steam, and in such case I may employ acids or acid substances containing water. Water may be added to the acid or acid substances whether or not the carbon monoxide is employed in admixture with steam. If desired, acid vapours (e. g. hydrogen chloride) may be added to the carbon monoxide or mixtures containing the same.

Instead of passing the carbon monoxide or mixtures containing the same into contact with liquid acid or acid substances I may, for instance, simply subject mixtures of steam and carbon monoxide to the reaction conditions in the presence of a gaseous or vaporous acid, such as hydrogen chloride or formic or acetic acid vapour. For instance, such mixtures may be passed through heated reaction zones which preferably contain cuprous chloride or the like. The reaction zones may advantageously contain pumice, kieselguhr, carborundum or other contact or filling materials which may, if desired, form supports for the cuprous chloride or the like where such is employed. I preferably employ mixtures of carbon monoxide and steam containing small or relatively small quantities of acid gases or vapours, as for instance about ½ to 10% by volume of the total gases; it is to be understood, however, that I in nowise limit myself to such quantities, as higher or lower quantities may, if desired, be employed.

Further, I may effect the reaction in presence of solid acids or acid substances such as tungstic acid or chromic acid in the solid form. Thus mixtures of carbon monoxide and steam may be passed under the desired pressure in contact with a heated solid acid or acid substance such as tungstic acid or chromic acid, preferably in admixture or association with cuprous chloride or other substance capable of absorbing carbon monoxide. Advantageously the solid acid or acid substances or mixtures thereof with cuprous chloride or the like are employed spread or coated upon filling or contact materials. The mixtures of carbon monoxide and steam may, if desired, contain gaseous or vaporous acids such as hydrogen chloride, formic or acetic acid vapour or the like.

For the purposes of the invention I may employ carbon monoxide in pure or substantially pure form or in the form of industrial or other gas mixtures containing carbon monoxide, e. g. water gas, power gas and the like. I preferably employ pure carbon monoxide or gaseous mixtures containing high or relatively high proportions of carbon monoxide, e. g. containing upwards of about 80% carbon monoxide. I prefer to employ gases substantially free from sulphur compounds or other catalyst poisons, but usually the presence of such substances does not appear to exert a very marked deleterious action on the reaction of the invention, though their presence may affect the purity of the products to be produced.

The following example is intended to illustrate the invention, but it is understood that the invention is in no way limited thereby.

*Example*

A mixture containing carbon monoxide and steam in approximately equal proportions is led through substantially anhydrous acetic acid heated to 220° C., and under a pressure of 15 atmospheres. The acid holds in suspension about 10% of its weight of cuprous chloride. The formic acid formed may be separated from the acetic acid in any convenient way, for example by fractional distillation.

It is to be understood that by the term "water" I mean water either in the liquid or in the vapour phase.

What I claim and desire to secure by Letters Patent is:

1. Process for the manufacture of formic acid which comprises reacting carbon monoxide and water at a temperature between about 100° C. and about 350° C. in the presence of a carboxylic acid which is stable and fluid at the temperature employed in the reaction.

2. Process for the manufacture of formic acid which comprises reacting carbon monoxide and water at a temperature between about 100° C. and about 350° C. in the presence of a lower fatty acid.

3. Process for the manufacture of formic acid which comprises reacting carbon monoxide and water at a temperature between about 100° C. and about 350° C. in the presence of formic acid.

4. Process for the manufacture of formic acid which comprises reacting carbon monoxide and water at a temperature between about 100° C. and about 350° C. in the presence of acetic acid.

5. Process for the manufacture of formic acid which comprises reacting carbon monoxide and water at a temperature between about 150° C. and about 250° C. in the presence of a carboxylic acid which is stable at the temperature employed in the reaction.

6. Process for the manufacture of formic acid which comprises reacting carbon monoxide and water in the presence of a carboxylic acid which is stable at the temperature employed for the reaction, at a temperature between about 100° C. and 350° C. and under superatmospheric pressure.

7. Process for the manufacture of formic acid which comprises reacting carbon monoxide and water at a temperature between about 100° C. and about 350° C. in the presence of a carboxylic acid which is stable at the temperature employed in the reaction, and of a substance capable of absorbing carbon monoxide.

8. Process for the manufacture of formic acid which comprises reacting carbon monoxide and water at a temperature between about 100° C. and about 350° C. in the presence of a carboxylic acid which is stable at the temperature employed in the reaction, and of cuprous chloride.

9. Process for the manufacture of formic acid which comprises reacting carbon monoxide and water at a temperature between about 100° C. and about 350° C. in the presence of a lower fatty acid and cuprous chloride.

10. Process for the manufacture of formic acid which comprises passing a mixture comprising carbon monoxide and water into a lower fatty acid in the liquid phase containing cuprous chloride at a temperature between 100° and 350° C. and under super-atmospheric pressure.

11. Process for the manufacture of formic acid which comprises passing carbon monoxide into an aqueous solution of a lower fatty acid containing cuprous chloride at a temperature between 100° and 350° C. and under super-atmospheric pressure.

12. Process for the manufacture of formic acid which comprises causing carbon monoxide to react with water at a temperature between 100° and 350° C. and under super-atmospheric pressure, in the presence of a lower fatty acid at least partially in the vapour phase, and of cuprous chloride.

13. Process for the manufacture of formic acid which comprises subjecting a mixture comprising approximately equal molecular proportions of carbon monoxide and water to reaction at a temperature between 150° and 250° C. and under a pressure between 1 and 20 atmospheres in the presence of a lower fatty acid and of cuprous chloride.

HENRY DREYFUS.